(12) United States Patent
Shultz et al.

(10) Patent No.: US 11,223,651 B2
(45) Date of Patent: Jan. 11, 2022

(54) AUGMENTED DATA COLLECTION FROM SUSPECTED ATTACKERS OF A COMPUTER NETWORK

(71) Applicant: International Business Machines Corporation, Armonk, NY (US)

(72) Inventors: Steven Shultz, Endicott, NY (US); Steven Paul Gessner, Apex, NC (US); Marci A. Beach, Johnson City, NY (US); Patricia M. Rando, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 16/526,169

(22) Filed: Jul. 30, 2019

(65) Prior Publication Data

US 2021/0037054 A1 Feb. 4, 2021

(51) Int. Cl.
*H04L 29/06* (2006.01)

(52) U.S. Cl.
CPC ...... *H04L 63/1491* (2013.01); *H04L 63/1416* (2013.01); *H04L 63/20* (2013.01)

(58) Field of Classification Search
None
See application file for complete search history.

(56) References Cited

U.S. PATENT DOCUMENTS

| 5,987,611 | A | 11/1999 | Freund |
| 6,085,224 | A | 7/2000 | Wagner |
| 6,141,686 | A | 10/2000 | Jackowski |
| 2002/0144157 | A1 | 10/2002 | Zhao |
| 2011/0185061 | A1* | 7/2011 | Chen .................. H04L 63/1416 709/225 |
| 2014/0096229 | A1* | 4/2014 | Burns ................. H04L 63/1491 726/15 |

(Continued)

OTHER PUBLICATIONS

Shay et al., "Beyond Sunglasses and Spray Paint: A Taxonomy of Surveillance Countermeasures", Technology and Society (ISTAS), 2013 IEEE International Symposium on, IEEE, 2013.

*Primary Examiner* — Joseph P Hirl
*Assistant Examiner* — Hassan Saadoun
(74) *Attorney, Agent, or Firm* — Andrew Aubert

(57) ABSTRACT

Technology for isolating suspicious activity on a plurality of servers for the purpose of mitigating damage (for example, unauthorized access to server data) to a network of computers and eliciting information about any suspicious clients involved in the suspicious activity. A suspicious client is identified, isolated, and permitted to continue interacting with the computer network to elicit information about the activity (for example, the identify of a suspicious client). Suspicious activity is defined by network administrators and determined using conventional techniques. The suspicious activity is isolated to prevent the suspicious client(s) from unauthorized and/or harmful actions on the network. The suspicious client(s) are permitted to resume network requests, in isolation, to covertly elicit information about the suspicious activity. Any data collected about the suspicious activity and/or suspicious client(s) are output, during and/or after the suspicious client(s) have disconnected from the network, for analysis.

16 Claims, 5 Drawing Sheets

(56) References Cited

U.S. PATENT DOCUMENTS

| | | | |
|---|---|---|---|
| 2014/0298469 A1* | 10/2014 | Marion | H04L 63/1416 726/23 |
| 2016/0119377 A1* | 4/2016 | Goldberg | G06F 40/40 726/12 |
| 2016/0323300 A1* | 11/2016 | Boss | H04L 63/1416 |
| 2017/0220796 A1 | 8/2017 | Cath | |
| 2017/0310705 A1* | 10/2017 | Gopalakrishna | H04L 41/0886 |
| 2018/0139179 A1* | 5/2018 | Ettema | G06F 21/602 |
| 2019/0058733 A1* | 2/2019 | Wright | H04L 63/1491 |
| 2020/0336510 A1* | 10/2020 | Li | G06N 20/00 |

\* cited by examiner

AUGMENTED DATA COLLECTION FROM SUSPECTED ATTACKERS OF A COMPUTER NETWORK

BACKGROUND

The present invention relates generally to the field of network security, and more particularly to programmatic counter measures to isolate suspicious activity and elicit information about said activity.

Network security covers a variety of computer networks, both public and private, that are used in everyday jobs; conducting transactions and communications among businesses, government agencies and individuals. Networks can be private, such as within a company, and other networks might be open to public access. Network security is involved in organizations, enterprises, and other types of institutions.

Big data is a term associated with the harvest and analysis of large data-sets to be utilized to extract useful information in the fields the data is related to. Current usage of big data tends to involve predictive analytics to predict individual user behavior, financial market trends, and other valuable predictions in various industries. Analysis of large data sets can lead to the discovery of correlations between various factors that may otherwise seem entirely independent from a human perspective alone.

In computers and computer networks an attack is any attempt to expose, alter, disable, destroy, steal or gain unauthorized access to, or make unauthorized use of, a computer asset. A cyber-attack is any type of offensive maneuver that targets computer information systems, infrastructures, computer networks, and/or personal computer devices. An attacker is a suspicious person, or process, that attempts to access data, functions or other restricted areas of a system without prior authorization.

SUMMARY

According to an aspect of the present invention, there is a method, computer program product and/or system for use with a plurality of server computers grouped into a plurality of management instances, including at least a first management instance, where each management instance includes at least one server computer, that performs the following operations (not necessarily in the following order): (i) receiving, by the first management instance, a first resource request from a first external client over a computer network; (ii) determining, by machine logic, that the first resource request is related to a suspected cyberattack; (iii) creating a second management instance, with the second management instance tasked exclusively with processing resource requests determined to be related to suspected cyberattacks according to a set of isolation rules; (iv) redirecting the first resource request to the second management instance, including notifying the first external client that the first resource request has been redirected to the second management instance; (v) processing the first resource request according to the set of isolation rules; (vi) outputting a resource request response, with the resource request response based, at least in part, on the set of isolation rules; and (vii) collecting a suspected cyber attacker data set based, at least in part, on the outputted resource request response.

DETAILED DESCRIPTION

Figure 1:
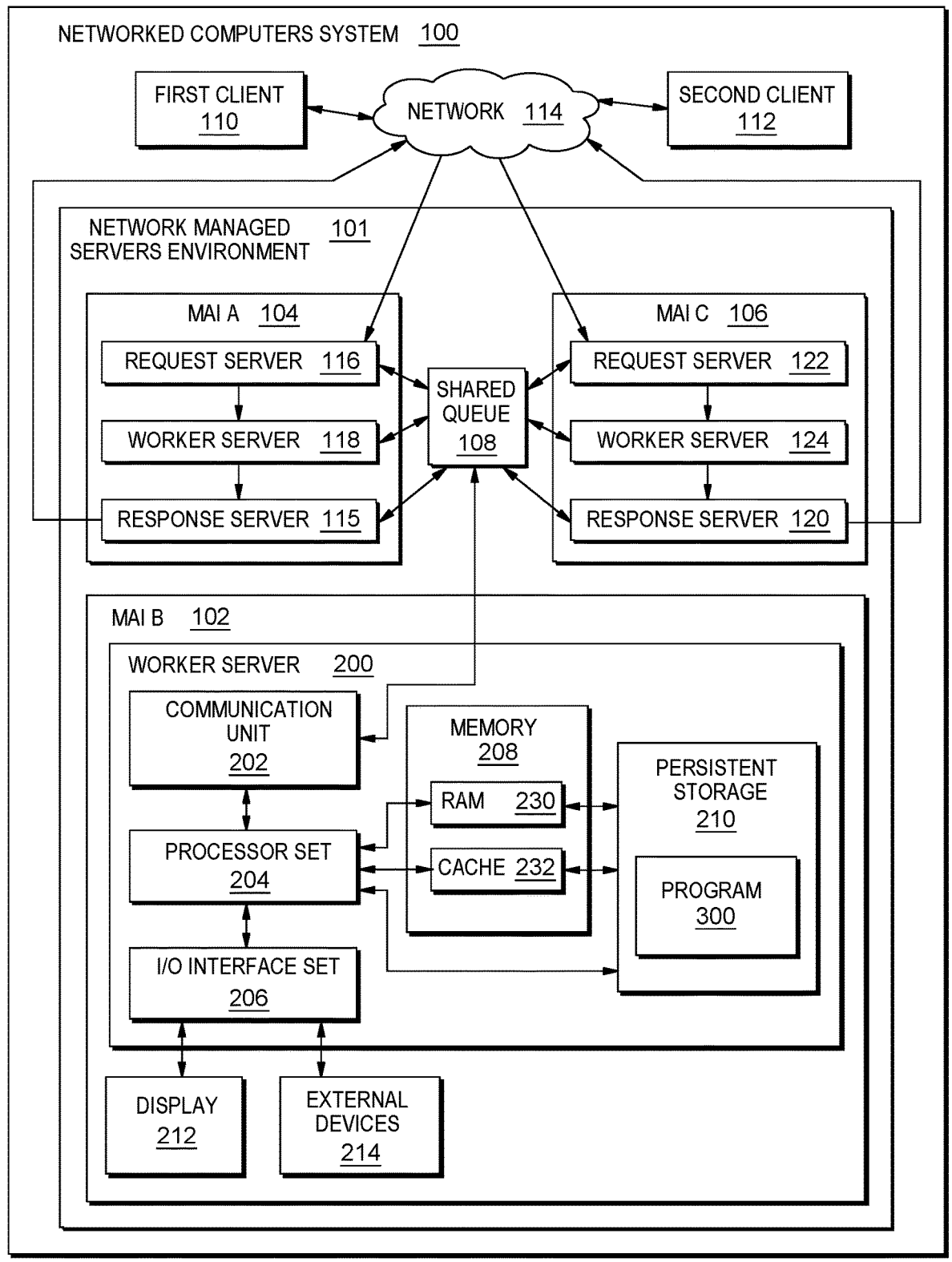
FIG. 1 is a block diagram view of a first embodiment of a system according to the present invention.

Embodiments of the present invention describe technology for isolating suspicious activity on a plurality of servers for the purpose of mitigating damage (for example, unauthorized access to server data) to a network of computers and eliciting information about any suspicious clients involved in the suspicious activity. A suspicious client is identified, isolated, and permitted to continue interacting with the computer network to elicit information about the activity (for example, the identify of a suspicious client). Suspicious activity may be defined by one or more entities with authorized access to a network and determined using conventional techniques. The suspicious activity is isolated to prevent the suspicious client(s) from unauthorized and/or harmful actions on the network. The suspicious client(s) are permitted to resume network requests, in isolation, to covertly elicit information about the suspicious activity. Any data collected about the suspicious activity and/or suspicious client(s) are output, during and/or after the suspicious client(s) have disconnected from the network, for analysis. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: Networked Managed Server Environment (N.M.S.E.) 101; MAI B sub-system 102; MAI A sub-system 104; MAI C sub-system 106; shared queue sub-system 108; first client 110; second client 112; communication network 114; response server sub-system 115; request server sub-system 116; worker server sub-system 118; response server sub-system 120; request server sub-system 122; worker server sub-system 124; worker server sub-system 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with worker server 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
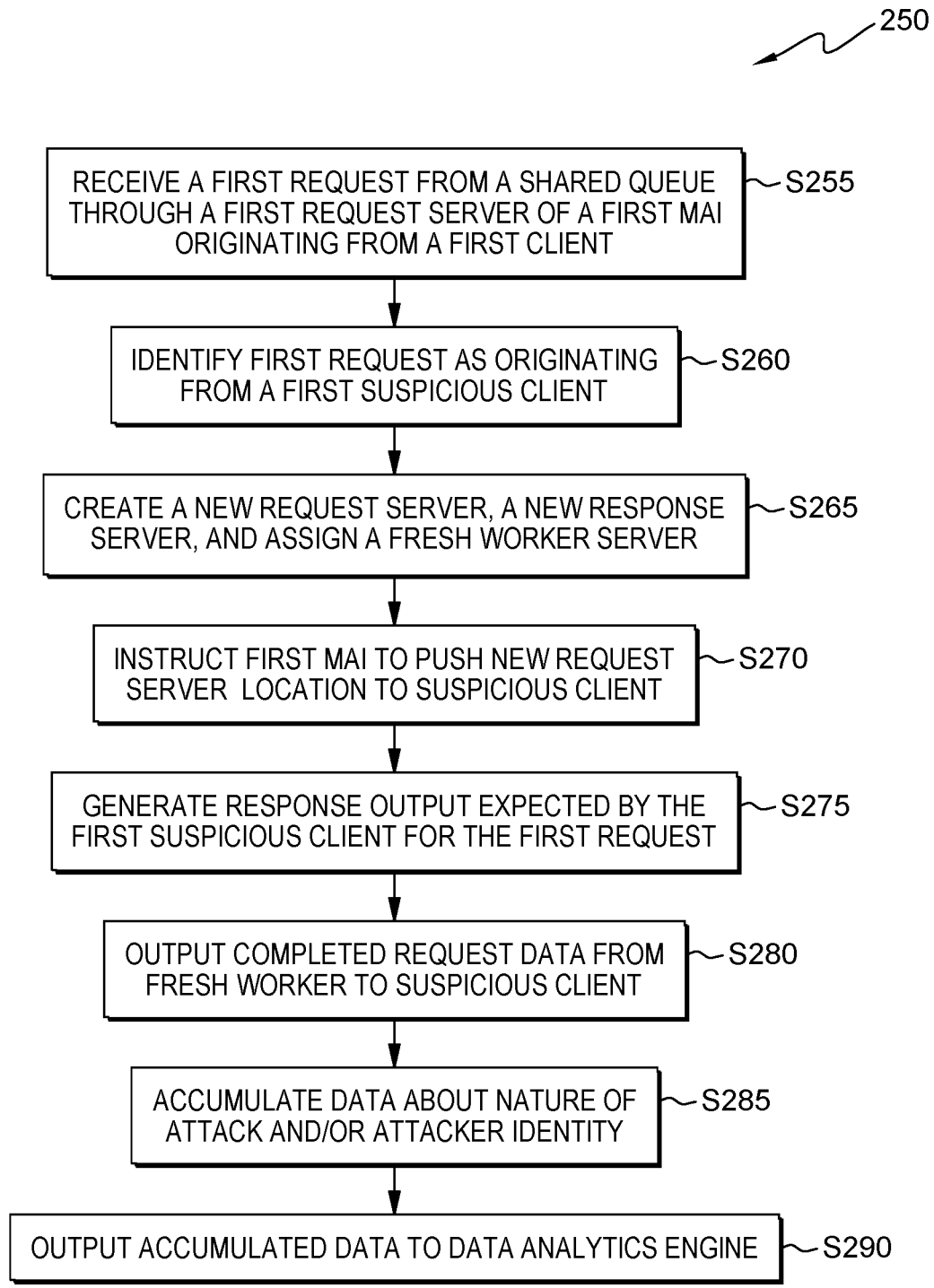
FIG. 2 is a flowchart showing a first embodiment method performed, at least in part, by the first embodiment system.
Figure 3:
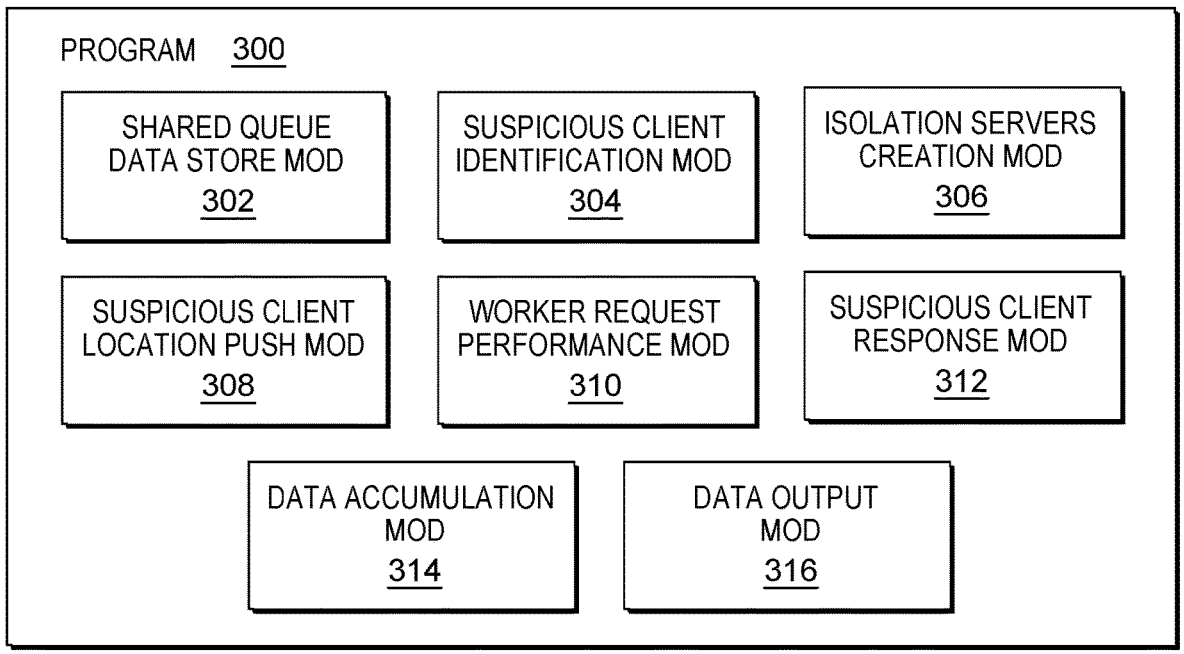
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where shared queue data store mod 302 receives a first request through a first request server 116 of FIG. 1 of a first Management Application Instance (MAI) 104 (sometimes herein referred to as "MAI A") through Networked Managed Servers Environment 101 (sometimes herein referred to as "N.M.S.E.") from first client 110. In this simplified embodiment, N.M.S.E. 101 consists of three MAIs that communicate internally through shared queue 108. Each MAI within N.M.S.E. 101 is composed of one, or more, server components, such as, a request server, worker server, and/or response server. A request server receives incoming requests to N.M.S.E. 101. A worker server processes incoming requests to N.M.S.E. 101 through a request server. A response server sends a response to a request to N.M.S.E. 101, that has been processed by a worker server. In this simplified embodiment, MAI A 104 is the primary Management Application Instance (MAI) that handles legitimate client interactions with N.M.S.E. 101. MAI A 104 receives incoming requests to N.M.S.E. 101 from clients through request server 116, processes the incoming requests through worker server 118, and responds to incoming requests through response server 115. In this simplified embodiment, first client 110 sends the first request to N.M.S.E. 101 through request server 116, the incoming request from first client 110 is accessible to other components of N.M.S.E. 101 through shared queue 108. Shared queue 108 is the network communication layer for all MAIs (i.e., MAI A 104, MAI B 102, and MAI C 106) for inter-MAI communications via N.M.S.E. 101. The first request is directed to request server 116 of MAI A 104 because MAI A 104 is programmed to handle initial requests unless the client, and/or request, has been flagged as "suspicious" as detailed below. In this simplified embodiment, all network communications passed are accessible to all MAIs within N.M.S.E. 101 through shared queue 108. In this simplified embodiment, a first request received by the primary MAI (i.e., MAI A 104) may be processed by a worker server of another MAI n (not shown), where n represents an identifier corresponding to another MAI associated with N.M.S.E. 101. For example, a first request directed to request server 116 of MAI A 104 is simultaneously loaded into shared queue data store mod 302 of FIG. 3 of program 300 by worker server 200 of FIG. 1. Alternatively, a MAI may contain any number, of any type of server. For example, a MAI may contain three request servers, two response servers, and five worker servers. As a further alternative embodiment, a N.M.S.E. may contain two, or more, shared queue communication layers with different access parameters. For example, a network may have three MAIs and two shared queues. The first shared queue is accessible to all three MAIs in the N.M.S.E., whereas the second shared queue is only accessible to two of the three MAIs to communicate. As yet a further alternative embodiment, client requests flagged as suspicious may not be accessible through shared queue 108, and instead assigned directly to another MAI as detailed below or logged in a second shared queue exclusively for suspicious requests.

Processing proceeds to operation S260 of FIG. 2, where suspicious client identification mod 304 identifies a first request as originating from a first suspicious client. In this simplified embodiment, a second MAI B 102 of FIG. 1 (sometimes herein referred to as "MAI B") consists of one worker server 200 which is solely responsible for processing first requests accessible through shared queue 108 to determine if first client 110 activity is suspicious. In this simplified embodiment, MAI B 102 is a MAI that will only have one, or more, worker servers tasked with identifying suspicious requests to N.M.S.E. 101. A "suspicious request" consists of unusual activity relative to what requests N.M.S.E. 101 expects to receive, and a request is identified as suspicious using conventional techniques. For example, a conventional technique to identify a suspicious request may include receiving multiple requests for an unusual location, such as multiple requests to a financial institution geographically located within a first country, while the requests originate from a second country geographically distant from the first country. For example, if the request is from a second country that is over a predefined threshold value of distance (such as one thousand miles) from the first country, and an explicit prior confirmation has not been received from an account holder that they would be travelling to or making a transaction from the second country, then the request might be identified as suspicious. A client that sent a request identified as suspicious, using conventional techniques, by worker server 200 may be identified as a "suspicious client." For example, to create a virtual machine (sometimes herein referred to as "VM") on N.M.S.E. 101 a client must provide a valid cell phone number with ten-digits, if a client provides a valid, ten-digit cell phone number then a VM is successfully created. In contrast, if a client provides an invalid, five-digit cell phone number then the invalid information will fail to create a VM on N.M.S.E. 101 and may label the client as "suspicious." Alternatively, "suspicious" requests may be customized to a network, that is, a request need not involve the creation of a VM to constitute suspicious activity. An unusual request is determined by the system configuration, with respect to typical requests for a given network managed servers environment. For example, a credit card that processes a request in a foreign country may be flagged as suspicious for a banking N.M.S.E. As a further alternative embodiment, the type of request may not be the indicator to determine if activity is suspicious, but rather, the frequency of a given request on a network may be suspicious. For example, the creation of one VM may not be suspicious for a N.M.S.E., but if a client requests to create 100 VMs in a ten-minute time period the activity may be considered suspicious. As yet a further alternative embodiment, a request may be identified as suspicious based on a threshold value. For example, a request to create ten VMs within a time window, defined by a finite quantity of time, may not be suspicious. In contrast, if a client requests to create any number of VMs greater than ten within that pre-defined time window, the request may be identified as suspicious. Alternatively, subsequent requests from a client previously flagged as a suspicious client are subjected to determinations regarding legitimacy to re-evaluate the suspicious client for legitimate behavior. For example, a request is determined by a N.M.S.E. to originate from a suspicious client, when the N.M.S.E. receives a second request from the same client, the N.M.S.E. analyzes the request to verify that the requests meets the criteria of "suspicious" to continue the isolation protocol. As yet a further alternative embodiment, suspicious activity may be determined from preceding invalid resource requests relative to an overall volume of requests for a given period of time, defined by a quantity of invalid/malformed resource requests exceeding a defined threshold for a defined period of time. For example, 98% of requests from a client were invalid over an eight-hour period to an N.M.S.E. that has a defined threshold value for suspicious activity identification at 75% invalid requests over an eight-hour period.

Processing proceeds to operation S265 of FIG. 2, where isolation servers creation mod 306 creates a new request server 122 of FIG. 1, a new response server 120, and assigns a fresh worker server 124. In this simplified embodiment, the new request server 122, response server 120, and fresh worker server 124 are components of a third MAI (sometimes herein referred to as "MAI C"), created in response to the identification of first client 110 as a suspicious client. MAI C 106 is a MAI for isolation servers, that is, servers quarantined from legitimate clients and their data. MAI C 106 interacts with MAI B 102 within N.M.S.E. 101 through shared queue 108. MAI C 106 only receives requests from first client 110 (which has been previously flagged/identified as a suspicious client at S260 of FIG. 2) through request server 122 of FIG. 1, processes the suspicious requests through worker server 124, and provides responses through response server 120. The interaction between MAI C 106 and the suspicious requests may be accessible through shared queue 108. In this simplified embodiment, first client 110 is the only client connected to N.M.S.E. 101 aware of MAI C 106, no other client connected to N.M.S.E. 101 will be provided with information that indicates MAI C 106 exists. MAI C 106 is not accessible to legitimate clients that interact with N.M.S.E. 101, with the intention of isolating first client 110, identified as suspicious, from other portions of N.M.S.E. 101 as detailed in later sections of this embodiment. A request processed by worker server 124 may be processed in a limited manner as detailed below. Alternatively, the MAI created by mod 306 of FIG. 3 may have a shared queue communication layer that is not accessible to some, or all, of other MAIs on the network. For example, a system may have two MAIs (e.g., MAI X and Y) that communicate on one shared queue, and a third MAI (e.g. MAI Z) created in response to suspicious activity may communicate through a second shared queue that is only accessible to MAI Y and MAI Z. As a further alternative embodiment, the quantity and types of servers created by isolation server mod 306 may be customized to fit specifications of a given application. For example, a worker server may identify a suspicious client and, in response, create two new request servers, two response servers, and seven worker servers. As yet a further alternative embodiment, MAI C 106 of FIG. 1 may exist previously, created in response to previously receiving another suspicious request, and all suspicious requests (from different suspicious clients) may be directed to the same MAI. For example, MAI C 106 was created in response to a suspicious first request from first client 110 to isolate the suspicious request from N.M.S.E. 101. At a later point in time, a second suspicious request was sent to N.M.S.E. 101 and the second suspicious client is directed to MAI C 106 for isolation. In some embodiments, each suspicious client is provided with their own worker server in a single MAI dedicated to isolation and/or quarantined purposes. For example, a first client may be isolated to one MAI for suspicious activity, and a second client may be isolated to a second MAI created in response to suspicious activity that may by unrelated to the first client.

Processing proceeds to operation S270 of FIG. 2, where suspicious client location push mod 308 instructs MAI A 104 of FIG. 1 to push to the identified suspicious client 110 a notification that the new request server 122 is the location for present and future requests from client 110. In this simplified embodiment, MAI C 106 is created in isolation servers creation mod 306 of FIG. 3, but first client 110 of FIG. 1 is still interacting with N.M.S.E. 101 through MAI A 104. MAI B 102 instructs MAI A 104 through shared queue 108 to redirect first client 110 to the isolated servers in MAI C 106. MAI A 104 sends a response to first client 110, identified as suspicious, through response server 115 that the request of client 110 has migrated to MAI C 106 which will process the present request and to direct future requests from first client 110 to the new request server 122. MAI C 106 will proceed to handle all requests from first client 110 to insulate the client's suspicious activity from MAIs that handle legitimate client requests (i.e., MAI A 104) on N.M.S.E. 101. From this point on in this simplified embodiment, first client 110 will send all requests to request server 122, requests will be processed by worker server 124, and will receive responses exclusively from response server 120. First client 110 will no longer have access to, or interaction with, MAI A 104 to prevent suspicious requests from causing harm to other resources connected to N.M.S.E. 101. Alternatively, the networked computers may push a suspicious client's location to an already existing set of servers that were specifically created prior to the interaction to handle suspicious clients. For example, a N.M.S.E. may have three MAIs (e.g., MAI D, E, and F), each with its own request, response and worker server. MAI D may be the primary MAI tasked with handling client interaction, and MAI E is responsible for watching all requests to MAI D to assess if any incoming requests are suspicious. If any request is determined to originate from a suspicious client, then future request locations are pushed to MAI F to handle all suspicious requests in isolation.

Processing proceeds to operation S275 of FIG. 2, where worker request performance mod 310 generates response output expected by the first suspicious client for the first request. In this simplified embodiment, worker server 124 of FIG. 1 processes the first request to N.M.S.E. 101 that was identified as suspicious by MAI B 102 through suspicious client identification mod 304 of FIG. 3. Worker server 124 of FIG. 1 does not actually process the first request, rather, it generates a response the suspicious client would expect to receive (sometimes herein referred to as "simulated response") that does not affect N.M.S.E. 101 (i.e., the simulated response does not involve allocating N.M.S.E. 101 resources to complete an actual response to the request). For example, a request to create a VM requires a valid, ten-digit cell phone number and the first request provided by the suspicious client contains an invalid, five-digit cell phone number. After the suspicious client location has been pushed by mod 308 of FIG. 3, the first request will be "processed" by worker server 124 of FIG. 1 by understanding the incoming request and generating an appropriate, simulated response to the request (i.e., VM has been successfully created) without actually making alterations to N.M.S.E. 101 that would otherwise occur for a legitimate, non-suspicious client, such as actually creating the requested VM or running a workload. Alternatively, a simulated response to the first request may result in an error, to elicit more information from the suspicious client. For example, a generated response to a first request to create a VM, deemed suspicious, may ask the suspicious client to re-submit the requested information such as a valid, ten-digit cell phone number. As a further alternative embodiment, performance of requests that originate from a suspicious client may be throttled, that is, the performance is significantly diminished relative to the performance of a request from a legitimate, non-suspicious client. For example, a request to create a VM from a legitimate, non-suspicious client may take ten-seconds to perform, whereas an identical request that originates from a suspicious client may take ten-minutes to perform. As yet a further alternative embodiment, the generated response may act as a confirmation system to confirm that the first request is in fact originating from a suspicious client, rather than a legitimate non-suspicious client that erroneously entered information. For example, a legitimate, non-suspicious client may be asked to enter a valid, ten-digit cell phone number to create a VM on N.M.S.E. 101 and, innocently, enter an invalid, nine-digit cell phone number which leads to a false-positive label that the client is suspicious. The generated response may include an error such as "VM not created, please enter a valid, ten-digit cell phone number," and when a valid, ten-digit cell phone number is received in the second request, the client is no longer labeled as suspicious and diverted back to the primary MAI A 104 to resume legitimate interaction with N.M.S.E. 101.

Figure 4:
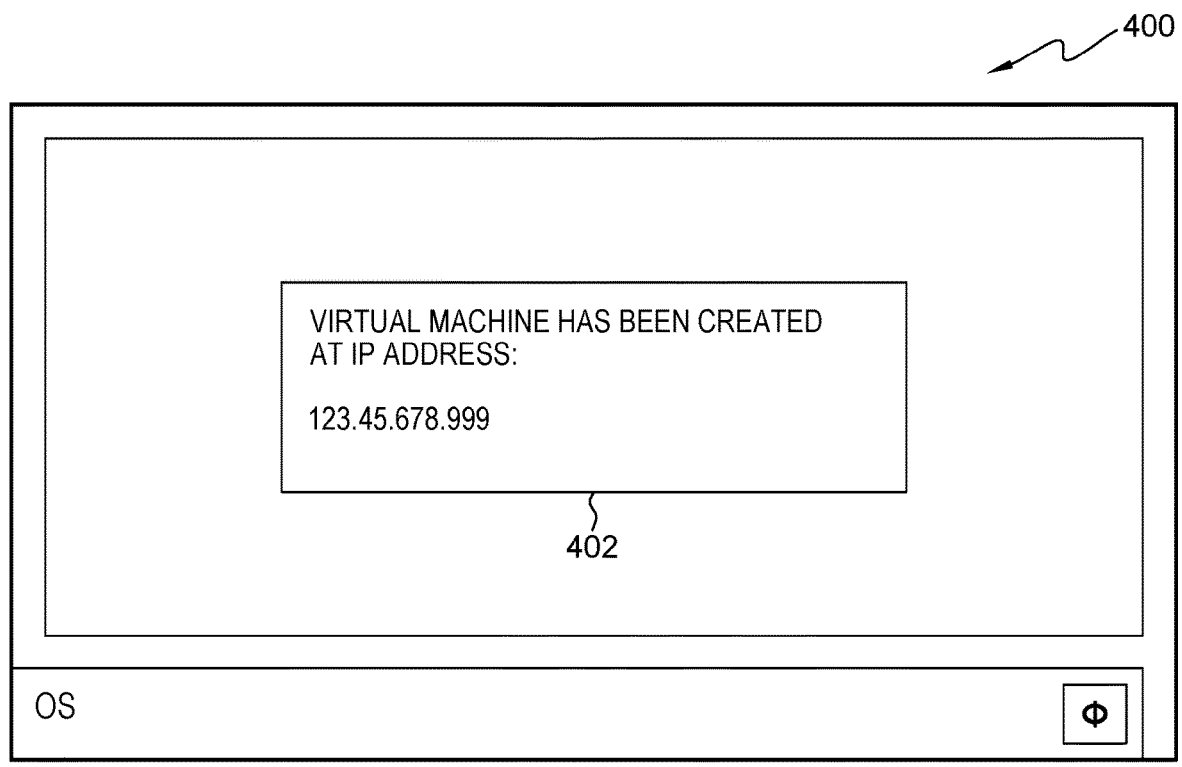
FIG. 4 is a screenshot view generated by the first embodiment system.

Processing proceeds to operation S280 of FIG. 2, where suspicious client response mod 312 outputs completed request data from fresh worker server 124 of FIG. 1 to suspicious client. In this simplified embodiment, MAI C 106 sends the "processed" response generated in worker request performance mod 310 of FIG. 3. The simulated response is sent through response server 120 of FIG. 1 to the suspicious client. The simulated response is displayed to the suspicious client in a form that the suspicious client would expect to receive had the first response been processed by N.M.S.E. 101. For example, when a legitimate, non-suspicious client's request to create a VM has been successfully performed a window may be displayed on the client's computer monitor that reads, "Virtual Machine Has Been Created at IP Address: AAA.YY.BBB.ZZZ," where 'AAA.YY.BBB.ZZZ' is a legitimate IP address created for the VM. A suspicious client's simulated response may look like window 402 of screenshot 400 of FIG. 4 which reads "Virtual Machine Has Been Created at IP Address: 123.45.678.999," where '123.45.678.999' appears to be a legitimate IP address that would be expected to correspond to a VM, and a VM created by N.M.S.E. 101 of FIG. 1 does not actually reside at that IP address. Alternatively, a simulated response to the first request may display a prompt in an effort to elicit more information from the suspicious client. For example, a simulated response to a suspicious client's request to create a VM may say, "To Create a VM More Information is Required—Please Provide a Valid E-Mail Address." As a further alternative embodiment, a simulated response to the first request may display a challenge response test to confirm that the request is in fact originating from a suspicious client. For example, a first request from a suspicious client to create a VM may generate and display a challenge response, on an isolated MAI, that asks the suspicious client to "Click on All Pictures That Have a Zebra to Create the VM." If the client sends a request back to the server that correctly identifies all pictures that have a zebra, the client is then determined to not be suspicious and is re-directed to the original server to process the original request to continue interaction with the N.M.S.E. In contrast, if the suspicious client incorrectly identifies pictures that have a zebra, the client is confirmed to be a suspicious client and remains in isolation.

Processing proceeds to operation S285 of FIG. 2, where data accumulation mod 314 accumulates data about the nature of attack and/or the attacker identity. In this simplified embodiment, MAI C 106 of FIG. 1 collects data about the suspicious client to enable data analytics on the attack and attackers. MAI C 106 continues to engage the suspicious client to keep the suspicious client on the line. MAI C 106 continues to perform suspicious client requests through worker request performance mod 310 of FIG. 3 and continues to respond to the suspicious client through suspicious client response mod 312. Suspicious client requests and responses are logged by worker server 124 of FIG. 1. For example, the first request to create a VM is processed and logged by worker server 124, a response is sent through response server 120. If the suspicious client makes subsequent requests to create additional VMs, the requests are sent to request server 122, processed and logged by worker server 124, and an appropriate response sent through response server 120. The suspicious client may attempt to interact with the created simulated VMs, the attempted interactions with the simulated VMs are processed and logged by worker server 124, with simulated responses sent through response server 120. MAI C 106 continues to engage in this manner to keep the suspicious client on the line to accumulate as much data about the suspicious client and/or its interaction with N.M.S.E. 101 as possible. In this simplified embodiment, all data processed and logged by worker server 124 is also logged by shared queue 108. Alternatively, the data processed and logged by worker server 124 is not logged to shared queue 108, or the data is logged in a limited capacity. For example, MAI C 106 continues to engage the suspicious client to accumulate as much as data as possible. Rather than permit access to the interaction through shared queue 108, all suspicious client interactions with N.M.S.E. 101 may be accessible through a second shared queue that is only accessible to MAIs created through mod 306 of FIG. 3. As a further alternative embodiment, one worker server in the isolated MAI is responsible for processing a suspicious client requests while one, or more, different worker servers of the same isolated MAI are responsible for recording data from the request. For example, a suspicious client request is received and processed by worker server X, and the accumulated data as a result of that interaction is recorded and stored by worker server Y.

Data may also be accumulated about confederates of the suspicious client. In this simplified embodiment, second client 112 of FIG. 1 interacts with the network after the suspicious client has been isolated in MAI C 106. Second client 112 sends a request to request server 122 and is identified as a collaborating, confederate to the suspicious client (i.e., first client 110) because the only entities that were previously aware of MAI C 106, and its request server 122, is the original suspicious client and MAI B 102. Therefore, to become aware of MAI C 106, second client 112 (sometimes herein referred to as "confederate client") must have been given information from the suspicious client in isolation to access MAI C 106 and, thus, second client 112 is suspected of collaborating with the original suspicious client. MAI C 106 actions to confederate requests are analogous to that of the original suspicious client. Second client 112 sends requests to request server 122, the requests are "processed" (i.e., simulated) by worker server 124 through worker request performance mod 310 of FIG. 3, and responses are sent through response server 120 of FIG. 1 through suspicious client response mod 312 of FIG. 3. Data is accumulated and stored by worker server 124 of FIG. 1. Accumulated data enables data analytics of second client 112 interactions with N.M.S.E. 101 as detailed in later sections of this embodiment. Alternatively, one worker server in an isolated MAI is responsible for processing confederate client requests while one, or more, different worker servers may be responsible for recording data from the confederate client requests. For example, a confederate client request is received and processed by worker server X, and the accumulated data as a result of that interaction is recorded and stored by worker server Y. As a further alternative embodiment, an isolated server may be accessed by two, or more, clients labeled as confederates. For example, a suspicious client may be isolated by an N.M.S.E. for suspicious activity when the suspicious client failed to provide a valid, ten-digit cell phone number to successfully create a VM. The simulation response informed the suspicious client that a VM had been created at IP address 123.45.678.999, when in fact no such VM had been created on the computer network. Subsequently, the VM "created" at IP address 123.45.678.999 was pinged by five new clients on the N.M.S.E. to gain access to resources utilized by the "created" VM. The knowledge of the false IP address and attempted access indicate the five new clients are confederate clients of the original suspicious client, and the N.M.S.E. proceeds to accumulate data on the five new clients as well as the original suspicious client in isolation. As yet a further alternative, confederate clients of the original suspicious client may be unwilling participants in the suspicious activity. For example, a simulation response that indicates a VM was created at IP address 123.45.678.999, when in fact no such VM had been created on N.M.S.E. 101. Subsequently, the VM "created" at IP address 123.45.678.999 was "accessed" by 100 new clients on N.M.S.E. 101 which are identified as confederates. Based on factors such as the nature of the attack, and time of requests, the data may indicate that the 100 confederate clients were unwilling participants in the suspicious activity and label them as such. This may have occurred through the original suspicious client's implementation of malware within unwilling confederate clients' computer to control the computers remotely.

Processing proceeds to operation S290 of FIG. 2, where data output mod 316 outputs accumulated data about suspicious clients and/or confederate clients interactions to a data analytics engine. In this simplified embodiment, the accumulated data from data accumulation mod 314 is output to a predetermined location for further analysis. The data accumulation period will discontinue, and thus be output, when the suspicious client, and related confederate clients, disengage from N.M.S.E. 101 of FIG. 1. For example, a suspicious client has sent ten requests to request server 122 which have all been processed and logged by worker request performance mod 310 of FIG. 3 with responses sent through suspicious client response mod 312. After the suspicious client has sent the ten requests, the suspicious client disengages with N.M.S.E. 101 of FIG. 1 and all of the collected data about the suspicious activity is output by data output mod 316 of FIG. 3 to a data file, such as a spreadsheet, for further analysis by a data analytics engine. Alternatively, accumulated data may be analyzed while the suspicious activity is occurring, rather than after the activity has concluded. The data analytics results may be used to influence future simulation responses provided by the isolated server. The influence may be designed to increase the quantity, and/or quality, of further data accumulation. For example, a suspicious client may first request to use a debit card in an unusual location without entering in a four-digit pin number. The accumulated data indicates the location of use and identifies that the card being used is debit. Rather than immediately deny the transaction, the system may generate a response that requests the input of a pin number to accumulate data about whether the suspicious client knows the valid pin number for the debit card. As a further alternative embodiment, the output of the data may be sent to two, or more, data analytics engines based on the type of suspicious activity and data that was accumulated. For example, a N.M.S.E. may have two separate functions, one that requires a client to input credit card information, and the other requires a client to input social security information. If a suspicious client interacts with both functions on the N.M.S.E., and submits both types of information (i.e., credit card and social security information), then the data output would contain two distinct data types. The data may then be sent to three distinct data analytics engines, one analyzes only the credit card data, the second analyzes only the social security data, and the third analyzes both the credit card and social security data. As yet a further alternative embodiment, accumulated data may be analyzed to identify one, or more, existing vulnerabilities in the computer network. For example, accumulated data about a recent cyberattack to a banking network may be output to a data analytics engine to elicit information about the nature of the attack. The analysis output by the data analytics engine identifies a specific type of web browser exploit used in the attack, and identifies the vulnerability in the banking network's website that the cyberattack was attempting to exploit.

III. Further Comments and/or Embodiments

Some embodiments of the present invention recognize the following facts, potential problems and/or potential areas for improvement with respect to the current state of the art: (i) a server accessible to outside communication is often attacked, to either: (a) disable the server, or (b) cause the server to perform unauthorized and/or harmful work; (ii) server attacks are especially dangerous when the server manages real computing resources to host thousands of servers, a level of privilege typically unavailable to the majority of servers; and (iii) current solutions (e.g. firewalls) are designed to end the attack and/or insulate the server from the current attack or attacks that closely resemble the current attack in a very narrow sense.

Some embodiments of the present invention may include one, or more, of the following features, characteristics and/or advantages: (i) counter-attack against attackers in order to gather information from attackers for such purposes as: (a) identify attackers, and (b) identify confederates, (c) detect future attacks in a more sophisticated manner, (d) establish defense mechanisms to deter future attacks, (e) establish defense mechanisms to prevent future attacks, and (f) counter-attack measures are accomplished while expeditiously rendering the original attack moot; (ii) a Management Application Instance (MAI) comprises: (a) Request Servers that receive requests from clients, (b) Worker Servers that process requests, (c) Response Servers that respond to requests, and (d) Shared Queues that are a communication mechanism used for internal communication among all servers that comprise an MAI, where all servers may place or remove an item from the queue (e.g. for reading); (iii) a single MAI may contain any number of any server type, and any number of shared queues; (iv) various MAI configurations may be used, such as: (a) two MAIs (MAI A and MAI B), (b) MAI A comprises two request servers (one public, one private), three worker servers, two response servers, and one shared queue (PUBLIC), (c) MAI B comprises zero request servers, two worker servers, and one shared queue (PUBLIC), and (d) PUBLIC is a shared queue accessible to all servers on MAIs A and B; (v) By default, a request to MAI A is processed completely by MAI A; (vi) Each MAI has the capability of "pushing" information to its clients; (vii) "Pushing" information includes the capability to inform clients that the MAI's public request location has moved, this capability are typically used in situations such as: (a) hardware and/or software upgrades, (b) hardware and/or software failures, and (c) load balancing; (viii) MAI B workers constantly monitor PUBLIC; (ix) If MAI B detects suspicious activity on PUBLIC such as an unusual amount or unusual mix of activity, then: (a) a new request server is created (or drawn from a pool) for each client, (b) the client is directed to the new request server, (c) the new request server may have new worker servers, or existing worker servers could be utilized, (d) if a suspicious client request server is provided worker servers distinct from any worker servers of all other request servers, all unsuspicious clients are insulated from any suspicious client activity, (e) suspicious clients may be allowed to continue making requests to the insulated MAI, and (f) suspicious client requests to the MAI can be used to gather information about suspicious clients; and (x) the insulated MAI may take actions, such as: (a) pretend to execute suspicious client requests, (b) pretend to give selective errors to suspicious client requests, and/or (c) vary the amount of time to process suspicious client requests.

Some embodiments of the present invention may include one, or more, of the following features, characteristics and/or advantages: (i) willing confederates of suspicious clients can be recognized by watching for activity based on responses given exclusively to the suspicious client, such as:

(a) a suspicious client gets a notification that its request server is being serviced, and thus a new request server is being provided, subsequently a willing confederate attempts to use the new request server, (b) a suspicious client is notified that its request to create a new server has been "successful", subsequently a willing confederate attempts to modify the new server, (c) a suspicious client attempts to power on a server known to it, but receives a notification that the suspicious client is not authorized to power on that server, subsequently a willing confederate attempts to power on that server, (d) a suspicious client makes a very large number of requests which all "succeed," but each request takes ten times as long as the previous one, after the requests pass a certain threshold in time, a willing confederate dramatically ups the pace of its requests, (e) a suspicious client obtains the authorization key for disk space owned by a particular server, subsequently a willing confederate attempts to use the key that the suspicious client obtained, (f) a suspicious client adds network ports to a server it has created, subsequently a willing confederate attempts to use the new network ports, and/or (g) a suspicious client is notified that new management APIs are available to it, subsequently a willing confederate attempts to use the new APIs; (ii) confederates of suspicious clients may be directed to an insulated MAI and subjected to actions such as: (a) pretend to execute requests, (b) pretend to give selective errors to requests, and/or (c) vary the amount of time to process requests; (iii) an apparent legitimate client may, unwillingly, carry out suspicious activity that is later exploited by a suspicious client or willing confederate, then the legitimate client may, in fact, be an unwilling confederate, such as: (a) a legitimate client (i.e., unwilling confederate) gets a notification that its request server is being serviced, and thus a new request server is being provided, subsequently a suspicious client and/or willing confederate attempts to use the new request server, (b) a legitimate client (i.e., unwilling confederate) is notified that its request to create a new server has been successful, subsequently a suspicious client and/or willing confederate attempts to modify the new server, (c) a legitimate client (i.e., unwilling confederate) obtains the authorization key for disk space owned by a particular server, subsequently a suspicious client and/or willing confederate attempts to use the key that the unwilling confederate obtained, (d) a legitimate client (i.e., unwilling confederate) adds network ports to a server it has created, subsequently a suspicious client and/or willing confederate attempts to use the new network ports, and (e) a legitimate client (i.e., unwilling confederate) is notified that new management APIs are available to it, subsequently a suspicious client and/or willing confederate attempts to use the new APIs; (iv) both willing and unwilling confederates may be useful in determining the identity and/or origin of a suspicious client; and (v) unwilling confederates may be useful in determining information, such as: (a) how the attack spreads, (b) future attack spreading patterns, (c) future speed of attack spread, and (d) programming paradigm of the suspicious client.

Some embodiments of the present invention may include one, or more, of the following features, characteristics and/or advantages: (i) arbitrary data may be "pushed" to suspicious clients to elicit revealing responses; (ii) arbitrary data is simulated, that is, it is false data pushed to suspicious clients of a type and/or form that the suspicious client would expect to receive from a given request (for example, if a suspicious client requests to create a new virtual machine, the system may respond that the virtual machine has been created without actually creating the virtual machine); (iii) suspicious client activity may be sent to an intelligent engine for analysis to determine methods to elicit more information; and (iv) the MAIs client's view of the managed system is encapsulated by the MAI and enables opportunity beyond merely shutting down an attack, such as: (a) identification of attack perpetrators, and/or (b) identification of strategies to establish defense mechanisms to detect, deter, and prevent future attacks.

Some embodiments of the present invention may include one, or more, of the following features, characteristics and/or advantages: (i) attackers may be identified if a client issues too many "malformed" requests over a given timeframe, that client would be considered an attacker; (ii) these criteria could apply to different uses for the servers described, such as: (a) a malformed request to a system management API is one where the data provided in the request is not consistent with a valid system management API call, (b) a malformed credit card request is one that gets the 3 to 4 character "security code" wrong, and (c) a malformed request to an email server may be one that qualifies for the spam folder by the spam definition provided to a mail server; (iii) too many requests over a given timeframe could, for example, be defined as "more than 99 over a 5-minute period"; (iv) attackers may be identified by a sequence of requests that don't make sense, such as: (a) for a system management API this could mean a sequence where a request is made to create a server, followed by a request to query the details of that server before the request to create is completed, (b) for a credit card, this could be the use of the same credit card at two restaurants 100 miles apart within ten seconds, and (c) for email, this could be someone sending the same attachment six times in one minute; (v) an attacker may be identified by high frequency, irregular activity; (vi) for all applications cited previously, this would be more requests from a single client per unit time than is reasonable; (vii) attackers may be identified by policy violations per unit time, such as: (a) for a system management API, a policy violation could be exceeding the client limits for CPU, and/or memory, and/or disk, (b) for a credit card, a policy violation could be exceeding the card's credit limit, and (c) for an email, a policy violation could be sending an attachment that is too large; (viii) an attacker may be identified, and isolated, based on a confidence level dependent response, such as: (a) if a system management API server received 50 malformed requests in five minutes, the recipient system management API server could slow down the server response, or (b) for 100 malformed requests, the recipient system management API server might not execute the function and return fake responses; (ix) an appropriate confidence level depends on the "job" that the MAI is doing; (x) what constitutes suspicious activity for a system management API is different than what constitutes suspicious activity for a credit card or email address; (xi) the confidence level is based on the type of "violation" as well as the application for which that violation is experienced; and (xii) if a legitimate user was improperly identified and treated as an attacker, the means to discover and correct improper identification depend on the violation and the application for which that violation is experienced, such as: (a) for a credit card, this might require a call or message to the credit card company, the action would be to re-enable the card to work, (b) for a system management API, this may require some "out-of-band" communication, and the action may be to execute the requests that were faked or speed up request processing for the client, and (c) for email, this may require some "out-of-band" activity, the action may be analogous to that with a system management API.

Some embodiments of the present invention may include one, or more, of the following features, characteristics and/or advantages: (i) the MAI mechanism to pretend to execute suspicious client request, or pushing arbitrary data, is doing what the servers already do, which is to give responses, while not actually performing any function, but still logging the request (for example, for a system management API, if the request were to be to create a server definition, a response to the request may say the server was created, while not actually updating the virtual configuration); (ii) a mechanism to enable the collection of as much available data as possible which may later be used to reduce or analyze data; (iii) gather as much data as possible over as wide a range of situations as possible about the attacker; and (iv) gathered data may be used with "big data" analytic software that identifies correlations in non-structured data and would have a good chance to discover correlations that a person may not see, or could not see because a human could not process that much data.

Some embodiments of the present invention may include one, or more, of the following features, characteristics and/or advantages: (i) allows continuing access, but surreptitiously isolates the offending client and surreptitiously elicits information from the client, and any confederates, while encouraging suspicious clients to "stay on the line"; (ii) surreptitiously continuing suspicious client access and exploiting that access to defend against the client and any confederates; (iii) monitors clients programmatically; (iv) programmatically and surreptitiously isolate the offending/suspicious clients; (v) programmatically and surreptitiously eliciting information from the client, and any confederates, while encouraging them to "stay on the line"; (vi) programmatically and surreptitiously exploiting suspicious clients to defend against the client and any confederates; (vii) allows all data to be passed; (viii) surreptitiously isolates the suspicious client and surreptitiously elicits information from the client, and any confederates, while encouraging them to "stay on the line"; (ix) does not delete data, data is used to programmatically and surreptitiously exploit the suspicious client to defend against the suspicious client and any confederates; (x) monitors clients at the application request level; (xi) programmatically and surreptitiously isolates the offending client, and programmatically and surreptitiously elicits information from the client, and any confederates, while encouraging them to "stay on the line"; (xii) starts from a higher semantic level and is able to take action at a higher semantic level; (xiii) monitoring, interpretation of communication, and eliciting of information is the core; (xiv) in addition to isolation, elements of embodiments of the present invention build upon isolation; and (xv) a tangible implementation of security issues.

Some embodiments of the present invention may include one, or more, of the following features, characteristics and/or advantages: (i) a configuration file to determine which MAI is responsible for which activities (i.e. determines how the novel techniques are coordinated); (ii) all MAIs communicate with other MAIs via a common communication layer (for example, a shared queue); (iii) communication with clients is handled by request and response servers via a standard communication protocol, such as: (a) TCP/IP, and (b) UDP, etc.; (iv) all requests, at some point, interact with the communication later, thus all requests can be viewed by all MAIs; (v) not all MAIs may be authorized to handle a request; (vi) rerouting a request may include actions, such as: (a) authorizing and/or unauthorizing request and/or response servers to handle particular clients, and (b) authorizing and/or unauthorizing worker servers to handle particular requests; and/or (vii) a MAI configured to determine whether requests and/or clients are suspicious includes the capability to authorize and/or unauthorize request, response and/or worker servers.

Some embodiments of the present invention may implement a method for gathering information about an entity attacking (e.g., attempting to hack into, or gain unauthorized access to) a computing device and/or server which includes some or all of the following steps (not necessarily in the following order): (i) receiving a request from an entity to access and/or utilize a computing device and/or server; (ii) determining that the request exceeds a suspicion threshold; (iii) rerouting the request such that the request is processed (or otherwise handled) with increased isolation (for example, there could be a server that is isolated from actual (i.e., legitimate) client data and/or activity); (iv) subsequent to rerouting the request, gathering information about entity interaction; and (v) recording the gathered information.

Some embodiments of the present invention may implement a method for gathering information about an entity attacking (e.g., attempting to hack into, or gain unauthorized access to) a computing device and/or server which includes some or all of the following steps (not necessarily in the following order): (i) receiving a request from an entity to access and/or utilize a computing device and/or server; (ii) determining that the request exceeds a suspicion threshold; (iii) rerouting the request such that the request is processed (or otherwise handled) with increased isolation (for example, there could be a server that is isolated from actual (i.e., legitimate) client data and/or activity); (iv) subsequent to rerouting the request, gathering information about entity interaction; (v) recording the gathered information; (vi) performing an action; and (vii) monitoring entity interaction.

Some embodiments of the present invention may implement a method for gathering information about an entity attacking (e.g., attempting to hack into, or gain unauthorized access to) a computing device and/or server which includes some or all of the following steps (not necessarily in the following order): (i) receiving a request from an entity to access and/or utilize a computing device and/or server; (ii) determining that the request exceeds a suspicion threshold; (iii) rerouting the request such that the request is processed (or otherwise handled) with increased isolation (for example, there could be a server that is isolated from actual (i.e., legitimate) client data and/or activity); (iv) subsequent to rerouting the request, gathering information about entity interaction; (v) recording the gathered information; (vi) generating a false result to the request and/or subsequent requests; (vii) generating selected errors; (viii) varying time to process the request and/or subsequent requests; and (ix) generating a response to previous reactions (e.g., to observe responses to a particular sequence of actions).

Some embodiments of the present invention may implement a method for gathering information about an entity attacking (e.g., attempting to hack into, or gain unauthorized access to) a computing device and/or server which includes some or all of the following steps (not necessarily in the following order): (i) receiving a request from an entity to access and/or utilize a computing device and/or server; (ii) determining that the request exceeds a suspicion threshold; (iii) rerouting the request such that the request is processed (or otherwise handled) with increased isolation (for example, there could be a server that is isolated from actual (i.e., legitimate) client data and/or activity); (iv) subsequent to rerouting the request, gathering information about entity interaction; (v) recording the gathered information; (vi) a first set of servers configured to receive requests from clients; (vii) a second set of servers configured to process requests; (viii) a third set of servers configured to responds to requests; and (ix) a shared queue configured for internal communication among the first, second, and third set of servers.

Figure 5:
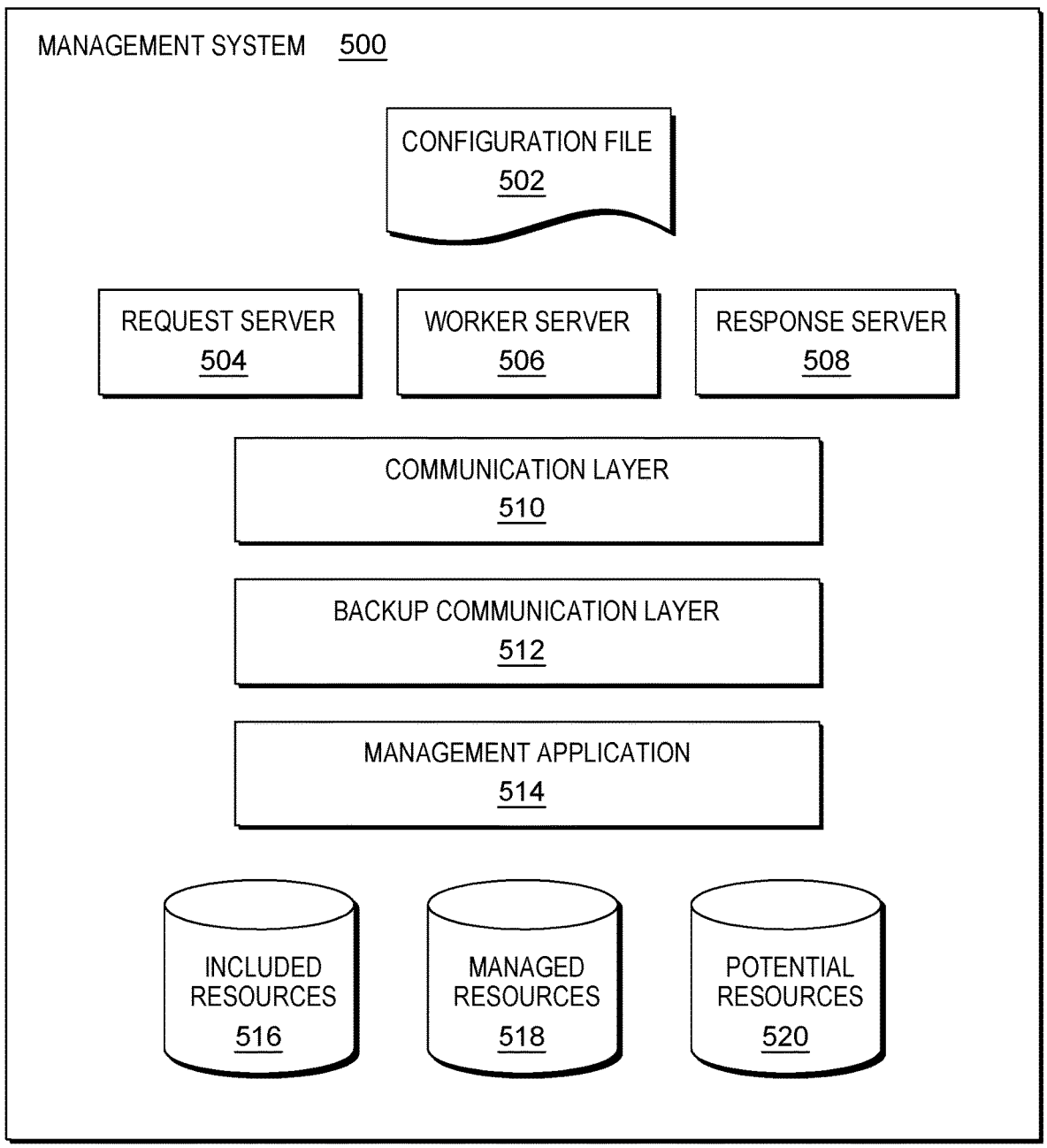
FIG. 5 is a block diagram of an aspect of a second embodiment of a system according to the present invention.

An embodiment of a possible hardware and software environment for software and/or methods according to the present invention will now be described in detail with reference to the Figures. FIG. 5 describes various portions of management system 500, which is an example management application instance (MAI) according to an embodiment of the present invention. Management system 500, includes: (i) network servers configuration file 502; (ii) 502 pertains to the configuration of request servers 504; (iii) 502 pertains to the configuration of worker servers 506; (iv) 502 pertains to the configuration of response servers 508; (v) servers have a common communication layer 510; (vi) servers have a backup communication layer 512; (vii) the servers interact, via the communication layer, with a management application 514; (viii) 514 has access to included resources 516; (ix) 514 has access to managed resources 518; and (x) 514 has access to potential resources 520.

Figure 6:
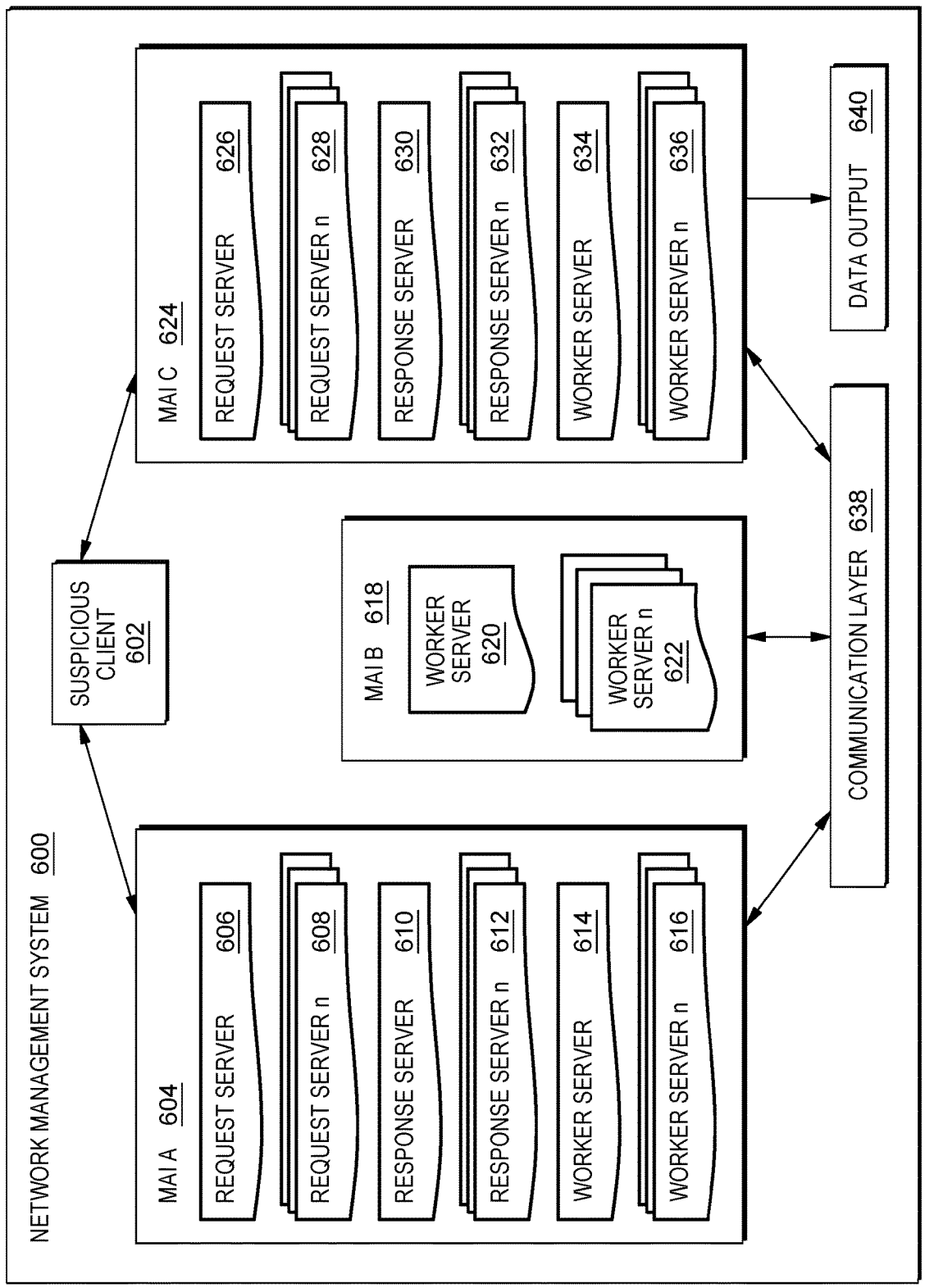
FIG. 6 is a block diagram of a second embodiment of a system according to the present invention.

An embodiment of a possible hardware and software environment for software and/or methods according to the present invention will now be described in detail with reference to the Figures. FIG. 6 describes various portions of network management system 600, which is an example configuration that consists of three MAIs, a communication layer, and its interaction with a suspicious client according to an embodiment of the present invention. Network management system 600, includes: (i) suspicious client 602; (ii) 602 makes requests to MAI A 604 which contains request server 606; (iii) 604 contains "n" request servers 608; (iv) 604 contains response server 610; (v) 604 contains "n" response servers 612; (vi) 604 contains worker server 614; (vii) 604 contains "n" worker servers 616; (viii) MAI B 618 contains worker server 620; (ix) 618 contains "n" worker servers 622; (x) 618 monitors requests to 604 for suspicious activity through communication layer 638; (xi) MAIs 604, 618, 624, and their respective servers, have a common communication layer 638; (xii) if 618 detects suspicious requests from 602 to 604, then 602 is directed to isolated servers in MAI C 624 for data accumulation; (xiii) 624 contains request server 626; (xiv) 624 contains "n" request servers 628; (xv) 624 contains response server 630; (xvi) 624 contains "n" response servers 632; (xvii) 624 contains worker server 634; (xviii) 624 contains "n" worker servers 636; and (xix) data accumulated by 624 pertains to data output 640.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use with a plurality of server computers grouped into a plurality of management instances, including at least a first management instance, where each management instance includes at least one server computer, the method comprising:

receiving, by the first management instance, a first resource request from a first external client over a computer network;

determining, by machine logic, that the first resource request is related to a suspected cyberattack;

creating a second management instance, with the second management instance tasked with processing resource requests determined to be related to suspected cyberattacks according to a set of isolation rules;

redirecting the first resource request to the second management instance;

processing the first resource request according to the set of isolation rules;

outputting a resource request response, with the resource request response based on the set of isolation rules;

collecting data about the first external client based on the outputted resource request response;

responsive to outputting the resource request response, receiving a plurality of subsequent resource requests, including a first subsequent resource request from a plurality of external clients, including at least a second external client, with the first subsequent resource request originating from the second external client, and the first subsequent resource request includes information indicative of the outputted resource request response; and responsive to receiving the plurality of subsequent resource requests, identifying at least the second external client as a suspected confederate cyber attacker collaborating with the first external client.

2. The CIM of claim 1 wherein:

processing the first resource request according to the set of isolation rules further includes at least one selection from the group consisting of: (a) generating a simulated resource request response that appears to indicate a successful result relative to the first resource request without actually allocating resources to complete an actual response to the first resource request, (b) generating selective errors when processing resource requests determined to be related to suspected cyberattacks, and (c) varying processing time of resource requests determined to be related to suspected cyberattacks; and determining, by machine logic, that the first resource request is related to a suspected cyberattack further includes at least one selection from the group consisting of: (a) the first resource request is a malformed request, and (b) the first resource request is preceded by a plurality of similar resource requests with the first resource request exceeding a threshold limit of similar requests over a period of time.

3. The CIM of claim 1 wherein redirecting the first resource request to the second management instance further includes notifying the first external client that the first resource request has been redirected to the second management instance.

4. The CIM of claim 1 wherein the set of isolation rules further includes:

a first rule for creating at least one isolated management instance isolated from processing legitimate resource requests;

a second rule for directing resource requests associated with suspected cyberattacks to the at least one isolated management instance;

a third rule for implementing protocols for processing resource requests based, at least in part, on a nature of the suspected cyberattack;

a fourth rule for implementing protocols to determine if a first resource request from a first external client over the computer network was erroneously determined to be related to a suspected cyberattack; and a fifth rule for implementing protocols to remove a first external client from isolation servers if a first external client was erroneously determined to be related to a suspected cyberattack.

5. The CIM of claim 1 further comprising:

the suspected cyber attacker data set is utilized by one, or more, data analytics engines to extract information related to the suspected cyberattack, including: (i) nature of the suspected cyberattack, (ii) identity of one or more computer devices associated with the suspected cyberattack, (iii) identity information corresponding to one or more suspected confederates of the suspected cyberattack, (iv) indicators to detect future cyberattacks, (v) vulnerabilities in the computer network, and/or (vi) defense mechanisms to future cyberattacks.

6. The CIM of claim 1 wherein the first management instance further includes:

a first worker server tasked with processing legitimate resource requests; and a second worker server tasked with determining, by machine logic, that the first resource request is related to a suspected cyberattack.

7. A computer program product (CPP) comprising:

a plurality of server computers grouped into a plurality of management instances, including at least a first management instance, where each management instance includes at least one server computer;

a machine readable storage device; and computer code stored on the machine readable storage device, with the computer code including instructions for causing a processor(s) set to perform operations including the following:

receiving, by the first management instance, a first resource request from a first external client over a computer network, determining, by machine logic, that the first resource request is related to a suspected cyberattack, creating a second management instance, with the second management instance tasked with processing resource requests determined to be related to suspected cyberattacks according to a set of isolation rules, redirecting the first resource request to the second management instance;

processing the first resource request according to the set of isolation rules;

outputting a resource request response, with the resource request response based on the set of isolation rules, collecting data about the first external client based on the outputted resource request response, responsive to outputting the resource request response, receiving a plurality of subsequent resource requests, including a first subsequent resource request from a plurality of external clients, including at least a second external client, with the first subsequent resource request originating from the second external client, and the first subsequent resource request includes information indicative of the outputted resource request response, and responsive to receiving the plurality of subsequent resource requests, identifying at least the second external client as a suspected confederate cyber attacker collaborating with the first external client.

8. The CPP of claim 7 wherein:

processing the first resource request according to the set of isolation rules further includes at least one selection from the group consisting of: (a) generating a simulated resource request response that appears to indicate a successful result relative to the first resource request without actually allocating resources to complete an actual response to the first resource request, (b) generating selective errors when processing resource requests determined to be related to suspected cyberattacks, and (c) varying processing time of resource requests determined to be related to suspected cyberattacks; and determining, by machine logic, that the first resource request is related to a suspected cyberattack further includes at least one selection from the group consisting of: (a) the first resource request is a malformed request, and (b) the first resource request is preceded by a plurality of similar resource requests with the first resource request exceeding a threshold limit of similar requests over a period of time.

9. The CPP of claim 7 wherein redirecting the first resource request to the second management instance further includes notifying the first external client that the first resource request has been redirected to the second management instance.

10. The CPP of claim 7 wherein the set of isolation rules further includes:
   a first rule for creating at least one isolated management instance isolated from processing legitimate resource requests;
   a second rule for directing resource requests associated with suspected cyberattacks to the at least one isolated management instance;
   a third rule for implementing protocols for processing resource requests based, at least in part, on a nature of the suspected cyberattack;
   a fourth rule for implementing protocols to determine if a first resource request from a first external client over the computer network was erroneously determined to be related to a suspected cyberattack; and
   a fifth rule for implementing protocols to remove a first external client from isolation servers if a first external client was erroneously determined to be related to a suspected cyberattack.

11. The CPP of claim 7 wherein the computer code further includes instructions for causing the processor(s) set to perform the following operations:
   the suspected cyber attacker data set is utilized by one, or more, data analytics engines to extract information related to the suspected cyberattack, including: (i) nature of the suspected cyberattack, (ii) identity of one or more computer devices associated with the suspected cyberattack, (iii) identity information corresponding to one or more suspected confederates of the suspected cyberattack, (iv) indicators to detect future cyberattacks, (v) vulnerabilities in the computer network, and/or (vi) defense mechanisms to future cyberattacks.

12. A computer system (CS) comprising:
   a plurality of server computers grouped into a plurality of management instances, including at least a first management instance, where each management instance includes at least one server computer;
   a processor(s) set;
   a machine readable storage device; and
   computer code stored on the machine readable storage device, with the computer code including instructions for causing the processor(s) set to perform operations including the following:
      receiving, by the first management instance, a first resource request from a first external client over a computer network,
      determining, by machine logic, that the first resource request is related to a suspected cyberattack,
      creating a second management instance, with the second management instance tasked with processing resource requests determined to be related to suspected cyberattacks according to a set of isolation rules,
      redirecting the first resource request to the second management instance,
      processing the first resource request according to the set of isolation rules,
      outputting a resource request response, with the resource request response based on the set of isolation rules,
      collecting data about the first external client based on the outputted resource request response,
      responsive to outputting the resource request response, receiving a plurality of subsequent resource requests, including a first subsequent resource request from a plurality of external clients, including at least a second external client, with the first subsequent resource request originating from the second external client, and the first subsequent resource request includes information indicative of the outputted resource request response, and
      responsive to receiving the plurality of subsequent resource requests, identifying at least the second external client as a suspected confederate cyber attacker collaborating with the first external client.

13. The CS of claim 12 wherein:
   processing the first resource request according to the set of isolation rules further includes at least one selection from the group consisting of: (a) generating a simulated resource request response that appears to indicate a successful result relative to the first resource request without actually allocating resources to complete an actual response to the first resource request, (b) generating selective errors when processing resource requests determined to be related to suspected cyberattacks, and (c) varying processing time of resource requests determined to be related to suspected cyberattacks; and
   determining, by machine logic, that the first resource request is related to a suspected cyberattack further includes at least one selection from the group consisting of: (a) the first resource request is a malformed request, and (b) the first resource request is preceded by a plurality of similar resource requests with the first resource request exceeding a threshold limit of similar requests over a period of time.

14. The CS of claim 12 wherein redirecting the first resource request to the second management instance further includes notifying the first external client that the first resource request has been redirected to the second management instance.

15. The CS of claim 12 wherein the set of isolation rules further includes:
   a first rule for creating at least one isolated management instance isolated from processing legitimate resource requests;
   a second rule for directing resource requests associated with suspected cyberattacks to the at least one isolated management instance;
   a third rule for implementing protocols for processing resource requests based, at least in part, on a nature of the suspected cyberattack;
   a fourth rule for implementing protocols to determine if a first resource request from a first external client over the computer network was erroneously determined to be related to a suspected cyberattack; and a fifth rule for implementing protocols to remove a first external client from isolation servers if a first external client was erroneously determined to be related to a suspected cyberattack.

16. The CS of claim 12 wherein the computer code further includes instructions for causing the processor(s) set to perform the following operations:

the suspected cyber attacker data set is utilized by one, or more, data analytics engines to extract information related to the suspected cyberattack, including: (i) nature of the suspected cyberattack, (ii) identity of one or more computer devices associated with the suspected cyberattack, (iii) identity information corresponding to one or more suspected confederates of the suspected cyberattack, (iv) indicators to detect future cyberattacks, (v) vulnerabilities in the computer network, and/or (vi) defense mechanisms to future cyberattacks.

\* \* \* \* \*